Patented May 23, 1950

2,508,429

UNITED STATES PATENT OFFICE 2,508,429

COMPOUNDED BITUMEN

Vaughn R. Smith, Berkeley, and Don E. Stevens, Fairfax, Calif., assignors to California Research Corporation, San Francisco, Calif., a corporation of Delaware No Drawing. Application February 17, 1949, Serial No. 77,063

11 Claims. (Cl. 106—273)

This invention relates to bituminous substances having adhesive properties, especially to bituminous substances having adhesiveness and strong affinity to mineral aggregates.

This application is a continuation-in-part of our copending application Serial No. 708,182, filed November 6, 1946 (now abandoned).

In the construction of roadways, it is customary to apply bituminous paving materials to the aggregate which is readily available to the site of the construction. A portion of this aggregate is usually of a hydrophilic nature, i. e., it absorbs water in preference to oils. Before the ordinary bituminous paving material is applied to this type of aggregate, it is preferred to dispel practically all of the moisture from the aggregate, otherwise a good bond is not obtained between the aggregate and the bituminous material. However, even though the aggregate is dried and a good initial bond is obtained, the unavoidable contact of the bituminous-aggregate composition with normal surface waters and rain water gradually brings about a breakdown of the aggregate-bituminous material bond. The water is gradually adsorbed by the aggregate, and the bituminous substance no longer holds the aggregate together, resulting in a breakdown of the roadway.

A number of substances have been made available for the purpose of strengthening the bond between hydrophilic aggregate and bituminous substances. These substances are incorporated into the bituminous substance and/or the aggregates. However, many of those substances which are of considerable effect for this purpose are relatively expensive for use in such large quantities as are required in a new roadway construction or in repair work. Other substances which are more readily available for this purpose and are relatively inexpensive still permit the breakdown of the roadway in the presence of moisture.

It is an object of this invention to provide adhesion agents for improving the adhesion of bituminous substances to mineral aggregates, and to provide bituminous materials containing the same, which adhesion agents are economical and at the same time are highly effective.

Further and other pertinent objects of this invention will become apparent from the following description and the appended claims.

It has been discovered that polyamine salts of phenols are effective, when used in small amount, to promote adhesion of bituminous materials to mineral aggregates and the like.

Thus, when diethylene triamine cetyl phenate is incorporated in an asphalt binder in a small amount, greatly improved adhesion to mineral aggregates is obtained, as shown by the data in the table below.

Table

| | Test Oil | Per Cent Film Retention [1] on Aggregates | | |
|---|---|---|---|---|
| | | Limestone | Silica | Rhyolite |
| A | 100% Medium Curing (MC-2) Asphalt Cut-Back | 70 | 30 | 40-50 |
| B | 99% Medium Curing (MC-2) Asphalt Cut-Back plus 1% diethylene triamine cetyl phenate paste | 90 | 100 | 90 |
| C | 99% Medium Curing (MC-2) Asphalt Cut-Back plus 1% diethylene triamine Cresylate-water mix | 90 | 80 | 95 |

[1] The film retention test which was used was the standard Nicholson film stripping test in which a sample of a coated and cured aggregate was subjected to the stripping action of water at 140° F. for 15 minutes with agitation. (Proc. Asphalt Paving Technologists, January 1932, page 43.)

The diethylene triamine cetyl phenate paste was prepared as follows: 1 part by weight of cetyl phenol was added with stirring (at room temperature) to 1 part by weight of a 70% water solution of diethylene triamine to form a water paste of diethylene triamine cetyl phenate.

The diethylene triamine cresylate-water mix was prepared by mixing (at room temperature) 1 part by weight of petroleum cresylic acid and 1 part by weight of a 70% water solution of diethylene triamine to form a diethylene triamine cresylate-water mixture.

The polyamine and the phenol may be reacted or mixed together to produce the desired polyamine salt merely by mixing (using heat if necessary) the polyamine and the phenol in the desired proportions. Preferably, the salt is prepared by mixing the polyamine and phenol in the presence of a diluent or solvent at room temperatures or at elevated temperatures to expedite admixture and reaction, but below decomposition temperatures of the reactants and of the final salt product. Upon completion of the reaction, the resulting product may be added as such or after removal of part or all of the diluent or solvent or in otherwise purified form, for example, the salt obtained after subjection of the reaction products to purification methods well known in the art, such as distillation or solvent extraction or a combination of such methods.

Instead of the diethylene triamine cetyl phenate and the diethylene triamine cresylate of the above examples, other polyamine phenates may be used, for example, diethylene triamine mesitylate, guanidine cresylate, pentamethylene diamine resorcinylate, urea cetyl phenate, propylene diamine lauryl naphthenate, octamethylene diamine chlorophenanthrate, hexamethylene heptamine nitrophenate, ethylene diamine cetoxy phenate, ethylene diamine thiocetoxy phenate, salt of polyethylene polyamine (molecular weight about 1200) with p-hydroxy stilbene, and salt of polyethylene polyamine (molecular weight about 1800) with p-hydroxy anisole. In the practice of this invention it is preferred to use an alkylene polyamine having from two to six carbon atoms, and from two to seven amino groups, e. g., ethylene diamine and diethylene triamine. The phenol may be phenol itself, an alkyl phenol such as cresol, amyl phenol or cetyl phenol, or any other phenol, preferably having substantial oil solubility.

In general, suitable phenolic materials include phenol itself, substituted phenols and mixtures thereof. The substituent groups on the aromatic nucleus to which the phenolic hydroxyl group is attached may be other hydroxyl groups; alkyl, aryl, alkaryl, arylalkyl, halogen, and nitro radicals; cyclic nonbenzenoid groups; and oxy radicals, that is, groups in which the hydrogen of a hydroxyl radical has been replaced by esterification, etherification, and the like. Also contemplated by the invention, but less preferably employed, in addition to the mononuclear phenols above-described, are the polynuclear phenols, such as naphthol, anthrol and phenanthrol, unsubstituted or having substituent groups similar to those enumerated above. Thus, by the term "phenol" it is intended to include both the mononuclear and polynuclear phenolic materials. Moreover, a suitable phenol is one capable of forming a salt with the polyamine, which salt is soluble in the bituminous material or may be stably dispersed therein.

The polyamine salts may be formed by reacting stoichiometric proportions of a polyamine and a phenol, or either reactant may be used in excess or the two ingredients may be used in the form of a physical mixture. In general, the method of incorporation of the polyamine salt contemplated by the invention in mixtures of aggregate and bituminous substance is not critical. Preferably, however, pre-formed salt of polyamine and phenol may be added to the bituminous substance and/or to the aggregate prior to admixture of the two. The salt may be formed in situ in either the aggregate or the bituminous substance or both. Or the salt-forming elements of polyamine and phenol may be added separately or combined in physical mixtures to either or both bituminous substance and aggregate, in which event it is believed that the salt product is formed upon the migration of the salt-forming elements to the interface of aggregate and bituminous substance. By "polyamine salt," therefore, it is intended to include the reaction product of the polyamine and phenol, as well as mere physical mixtures of the two salt-forming elements. As used herein, the term "polyamine salt" or "polyamine phenate" includes the salt obtained by the chemical reaction of a polyamine and a phenol and the physical mixture of a polyamine and a phenol.

The term "polyamine," as used herein, means an organic compound containing at least two amino groups ($-NH_2$ groups), two imino groups ($>NH$ groups), or an amino and an imino group, at least one such group being capable of forming salts with acidic substances.

Polyamines comprehended by the invention include polyamines having at least two terminal amino groups, which because of the terminal groups, are essentially hydrophilic and are ordinarily considered to be relatively cation surface inactive materials, for example, ethylene diamine; polyamines which, although not possessing terminal amino groups have terminal carbon chains with fewer than 12 carbon atoms contained therein, that is, terminal chains having a carbon content below the minimum ordinarily considered to be necessary in such chains in order to impart surface activity to the molecule, for example, 2,5-diamino dodecane; substantially cation surface inactive polyalkylene polyamines, such as tetraethylene pentamine.

In general, polyamines included within the scope of the invention may vary from polyamines containing two carbon atoms to polyalkylene polyamines containing 60 or more carbon atoms. Suitable polyamines are such that when formed into a salt with the phenol, the salt may be dispersed in the bituminous material, whether or not true solutions or mere stable dispersions of the salt and the bituminous materials are formed.

Specific examples of polyamines are trimethylene diamine, pentamethylene diamine, phenylene diamine, tolylene diamine, histamine, methyl guanidine, triethylene tetramine, diethylene triamine, tetraethylene pentamine, guanidine, diguanide, N-methylamino aniline, urea and thiourea, decamethylene diamine, octadecyl diamine, hexamethyl-trimethyl triamine, ethylene diamine, propylene diamine, etc.

Similarly, instead of the asphalt cut-backs of the above examples, other bituminous materials or bitumens may be used, for example, straight asphalt (of petroleum origin or natural origin), road oils, coal tars, coal tar pitches and emulsions of these various materials in water.

The polyamine salt may be added to the bituminous material before the latter is mixed with aggregate, in which case it may be used in an amount of about 0.05% to 10%, (0.1% to 2% being preferred) by weight of bituminous material; or it may be added to the aggregate before the latter is mixed with the bituminous material, in which case the polyamine salt may be used in the amount of about .001 to 1% (0.01 to 0.5% being preferred) by weight of the aggregate. Where the bituminous material exists in the continuous phase it is preferred to add the polyamine salt to the bituminous material, but where the bituminous material is emulsified in water it is preferred to add the polyamine salt to the aggregate.

The salts herein contemplated need not be added to the bitumen and/or to the aggregtae in pure form. For example, in the event a diluent, for example, kerosene, for any or both of the salt-forming reactants is employed, upon formation of the salt the diluent need not be removed from the reaction product prior to its use with the bitumen, sufficient amount of the diluted salt being used to give the calculated desired amount of salt in the finished product.

Conversely, it is often advantageous to prepare a concentrate of the salt, which concentrate may then be incorporated into either bitumen or aggregate, or both, in the desired amounts. Such a procedure has the advantage of providing for more intimate admixture of the salt and the material to be treated. Concentrates of hydrocarbon oil, such as kerosene or naphtha, containing from about 15 per cent to as much as 50 per cent, by weight, of the salt are quite satisfactory. In addition to kerosene, other hydrocarbon diluents or solvents may be employed in the preparation of the concentrate. Such materials include mineral oils, lubricating oils and the like. Examples of other diluents are bituminous substances such as the so-called liquid asphalts hereinabove mentioned.

The term "polyalkylene polyamine" is intended to include ethylene diamine, propylene diamine, and higher similar unpolymerized compounds, since the alkylene group of such compounds may be considered as containing more than one alkylene methylene group ($-CH_2-$), and hence may be considered as being polyalkylene polyamines.

It is not intended that this invention shall be limited by the above illustrative examples but only by the appended claims.

We claim:

1. A bituminous composition having superior anti-stripping properties consisting essentially of a bitumen normally possessing stripping tendencies and, intimately dispersible therein, an amount sufficient substantially to lessen stripping of said bitumen of the salt of a phenol and a polyalkylene polyamine.

2. A composition substantially as described in claim 1, wherein the bitumen is asphalt.

3. A composition substantially as described in claim 1, wherein the salt is present in an amount of about 0.05 to about 10% by weight of the bitumen.

4. A composition substantially as described in claim 1, wherein the salt is present in an amount of about 0.1 to about 2% by weight of the bitumen.

5. A composition substantially as described in claim 1, wherein the phenol is a mononuclear phenol.

6. A composition substantially as described in claim 1, wherein the phenol is a mononuclear alkyl phenol.

7. A bituminous road construction composition consisting essentially of, in intimate combination, mineral aggregate, a bituminous substance, and about 0.05 to about 10% by weight of the bituminous substance of the salt of a phenol and a polyalkylene polyamine.

8. A bituminous road construction composition substantially as described in claim 7, wherein the salt is present in an amount of about 0.1 to about 2% by weight of the bitumen.

9. A bituminous road construction composition substantially as described in claim 7, wherein the phenol is a mononuclear phenol.

10. A bituminous road construction composition substantially as described in claim 7, wherein the phenol is a mononuclear alkyl phenol.

11. A bituminous road construction composition substantially as described in claim 7, wherein the bituminous substance is asphalt.

VAUGHN R. SMITH.
DON E. STEVENS.

REFERENCES CITED

The following references are of record in the file of this patent:

UNITED STATES PATENTS

| Number | Name | Date |
|---|---|---|
| 1,822,548 | Ter Horst | Sept. 8, 1931 |
| 1,830,859 | Schotte et al | Nov. 10, 1931 |
| 1,852,820 | Murrill | Apr. 5, 1932 |
| 1,872,826 | Schulemann et al. | Aug. 23, 1932 |
| 1,939,365 | Piccard | Dec. 12, 1933 |
| 1,940,815 | Semon | Dec. 26, 1933 |
| 2,004,914 | Wolfe | June 11, 1935 |
| 2,053,466 | Downing | Sept. 8, 1936 |
| 2,191,295 | Dohse et al. | Feb. 20, 1940 |
| 2,256,753 | Scheumann | Sept. 23, 1941 |
| 2,313,988 | Britton et al. | Mar. 16, 1943 |
| 2,367,534 | Smith et al. | Jan. 16, 1945 |
| 2,370,386 | Anderson et al. | Feb. 27, 1945 |
| 2,387,537 | Smith et al. | Oct. 23, 1945 |